United States Patent [19]

Shimura

[11] Patent Number: 4,837,801
[45] Date of Patent: Jun. 6, 1989

[54] BASE STATION CAPABLE OF MONITORING OCCURRENCE OF INTERFERENCE ON EVERY TRANSMISSION

[75] Inventor: Yukihiro Shimura, Tokyo, Japan

[73] Assignee: NEC Corporation, Tokyo, Japan

[21] Appl. No.: 47,792

[22] Filed: May 8, 1987

[30] Foreign Application Priority Data

May 9, 1986 [JP] Japan ................................. 61-104969

[51] Int. Cl.$^4$ ........................................... H04M 11/00
[52] U.S. Cl. ........................................ 379/61; 379/63
[58] Field of Search ....................... 379/63, 61, 62, 60

[56] References Cited

U.S. PATENT DOCUMENTS

| 4,628,152 | 9/1986 | Akerberg | 379/61 |
| 4,656,653 | 4/1987 | Oda et al. | 379/61 |
| 4,672,657 | 6/1987 | Dershowitz | 379/63 |

*Primary Examiner*—Robert Lev
*Attorney, Agent, or Firm*—Sughrue, Mion, Zinn, Macpeak & Seas

[57] ABSTRACT

In a radio communication network comprising a base station (11) and a plurality of wireless telephone sets (12) each of which is communicable with the base station by the use of a plurality of speech radio waves and a control radio wave, a control wave monitoring circuit (22) is included in the base station to monitor the control radio wave on transmission of an allocated one of the speech radio waves and to determine whether or not interference occurs in the control radio wave due to the transmission. On occurrence of such interference in the control radio wave, the allocated speech radio wave is changed to another speech radio wave under control of a line control portion (15). When the control radio wave is divisible into a down control channel directed from the base station towards the wireless telephone sets and an up control channel directed from the wireless telephone sets to the base station, the control wave monitoring circuit monitors the down control channel. Alternatively, the up control channel may be monitored by the control wave monitoring circuit. Each of the wireless telephone sets may be either a cordless telephone set or a mobile telephone set.

8 Claims, 7 Drawing Sheets

BASE STATION CAPABLE OF MONITORING OCCURRENCE OF INTERFERENCE ON EVERY TRANSMISSION

BACKGROUND OF THE INVENTION

This invention relates to a radio communication network between a plurality of telephone lines and a plurality of wireless telephone sets or units and, in particular, to a base station for connection to a plurality of substations, such as subscribers, through the telephone lines in the radio communication network. It is to be noted throughout the instant specification that the radio communication network may be a mobile telephone network comprising a plurality of mobile telephone sets, although description will be made only about a cordless telephone network comprising a plurality of cordless telephone sets.

A conventional cordless telephone network generally comprises a base station which is coupled to a single cordless telephone set on communication through a single radio channel preassigned to the cordless telephone set. Thus, the base station is in one-to-one correspondence to the cordless telephone set and is connected to subscribers through a telephone line accommodated in the base station.

Under the circumstances, it might be preferable that consideration is made about installation of a plurality of cordless telephone sets at an individual subscriber in order to respond to demand in market. In this event, a plurality of base stations might have to be installed at the individual subscriber along with a plurality of telephone lines accommodated in th respective base stations and with a plurality of radio channels or waves having different frequencies. The radio waves are used for speech and will therefore be referred to as speech radio waves hereinunder. From the above, it is apparent in the above-exemplified cordless telephone network that each number of the base stations and the telephone lines might have to be equal to the number of the cordless telephone sets.

In addition, the cordless telephone sets must be operable independently of one another and might be simultaneously put into an active state through different ones of the speech radio waves. Preferably, each of the cordless telephone sets may be communicable through every one of the radio waves. Therefore, each of the speech radio waves is probably used in common to the respective cordless telephone sets. Taking this into consideration, a control radio wave or channel must be included in the radio waves to control allocation of the plurality of cordless telephone sets to the speech radio waves.

With such a network, an interference may take place between the control radio wave and a combination of active one or ones of the speech radio waves due to mutual modulation or intermodulation therebetween. Such an interference seriously and adversely affects communication and might ultimately make both transmission and reception operation impossible. It may be considered that similar interference also occurs among the active speech radio channels.

More particularly, let two adjacent ones of the speech radio waves be represented by $f_1$ and $f_2$ and be being used now as desired radio waves in the network in question. The radio waves $f_1$ and $f_2$ are inevitably supplied to a radio transmitter and a radio receiver which are installed in each of the base stations and the cordless telephone sets and which may collectively be called a radio unit. Inasmuch as such a radio unit usually comprises nonlinear elements, such as transistors, diodes, and the like, having nonlinear characteristics, the desired radio waves are subjected to an influence of nonlinear distortion by the nonlinear elements. As a result, the radio unit produces, in addition to the desired radio waves, undesired frequency components resulting from the nonlinear characteristics of the nonlinear elements. In this case, a serious problem arises from third-order one of the nonlinear distortion that includes intermodulation distortion specified by intermodulation components $(2f_1-f_2)$ and $(2f_2-f_1)$, besides harmonic distortion. Overlap of such intermodulation components with the control radio wave makes connection control impossible because the control radio wave is put into a state like an exclusive and objectionable occupation by the intermodulation components. Specifically, there is a strong probability of the above-mentioned overlap when the control radio wave and the speech radio waves are arranged at an equal interval of frequency.

As a rule, faults, such as interference, intermodulation, and the like are liable to occur when a plurality of radio units are adjacent to one another, as well known in the art. In order to avoid such faults, conventional countermeasures are mainly directed to realization of complete shield between the radio units and to use of amplifying elements having excellent linearity. However, such countermeasures result in an increase of costs and an increase of size of each radio unit.

SUMMARY OF THE INVENTION

It is an object of this invention to provide a radio communication network which is capable of avoiding interference between radio channels even when a plurality of radio units are adjacent to one other.

It is another object of this invention to provide a base station which is applicable to radio communication network of the type described and which can favorably prevent occurrence of interference and intermodulation.

It is still another object of this invention to provide a base station of the type described, which is communicable with a plurality of cordless telephone sets through a plurality of radio waves.

It is further object of this invention to provide a base station of the type described, wherein inexpensive nonlinear elements may be used as amplifying elements.

A base station to which this invention is applicable is for use in a radio communication network between a plurality of telephone lines connected to substations and a plurality of wireless telephone sets for communication by the use of a plurality of radio waves having different frequencies. The base station comprises line interface means for connection to the plurality of the telephone lines, a plurality of radio communication units for communication with the respective wireless telephone sets through the radio waves, and connection control means intermediate between the line interface means and the radio communication units for selectively connecting the line interface means to the radio communication units. The radio waves include a plurality of speech radio waves for speech between the wireless telephone sets and the substations and a control radio wave predetermined for allocation control of the speech radio waves. According to this invention, the base station comprises monitoring means for monitoring the control radio wave on transmission of an allocated one of the speech radio waves to determine whether or not the control radio wave is subjected to interference by the transmission of the allocated one of the speech radio waves. The monitoring means supplies the connection control means with a switching request signal indicative of a request for switching the allocated one of the speech radio waves when the interference is monitored. The connection control means comprises means responsive to the switching request signal for changing the allocated one of the speech radio waves to another one of the speech radio waves.

DESCRIPTION OF THE PREFERRED EMBODIMENT

Figure 1:
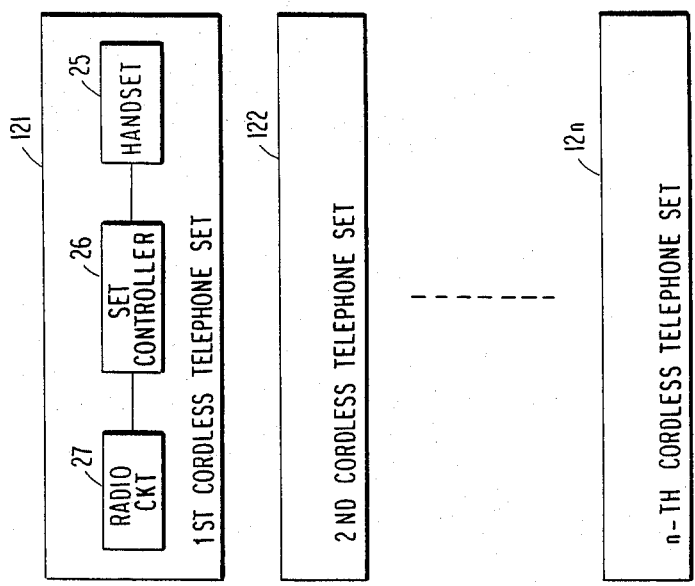
FIG. 1 is a block diagram of a radio communication network comprising a base station according to a preferred embodiment of this invention and a plurality of cordless telephone sets to be connected to the base station.
Figure 1:
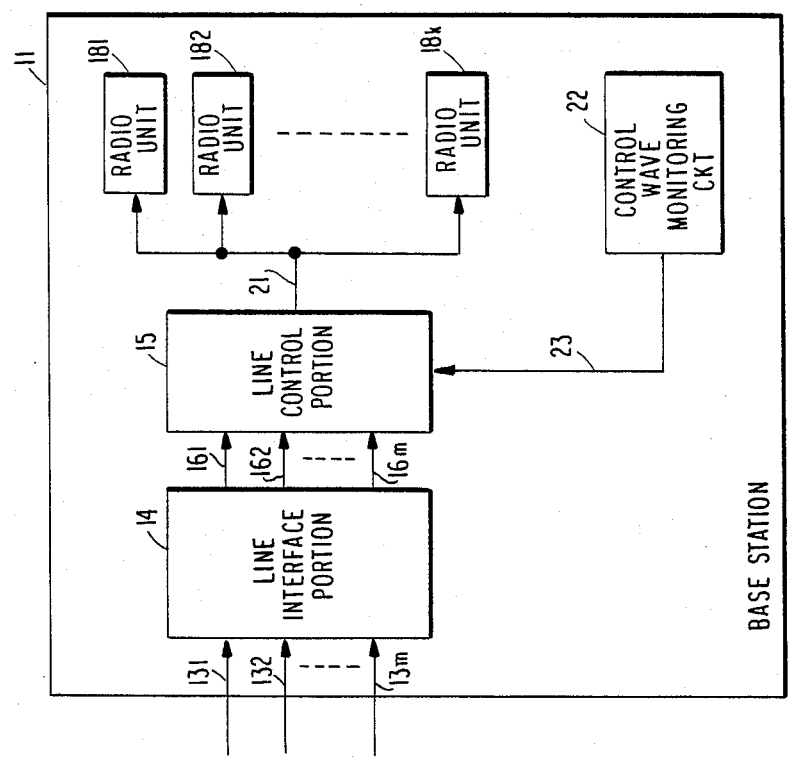

Referring to FIG. 1, a radio communication network comprises a base station 11 according to a preferred embodiment of this invention and a plurality of wireless telephone sets which may be recognized as cordless telephone sets 12, respectively, and which are assumed to be equal in number to n. Accordingly, the illustrated radio communication network may be regarded as a cordless telephone network for use in a family or company. In this connection, the illustrated base station 11 may be considered as being assigned to a single subscriber. Taking the above into account, the cordless telephone sets 12 are numbered from 121 to 12n which may be called first through n-th telephone sets, respectively. The first through n-th telephone sets 121 to 12n may be similar in structure to one another. Therefore, detail illustration is made only about the first telephone set in FIG. 1.

In FIG. 1, the base station 11 accommodates a plurality of telephone lines which are depicted at 131 to 13m and which may be subscriber lines connected to other subscribers or parties. The number of the telephone lines 131 to 13m is not always equal to the number of the cordless telephone sets.

It is assumed that a plurality of radio waves or channels are assigned to the base station 11 and have different frequencies from one other. Each of the first through n-th telephone sets 121 to 12n is communicable with the other parties or subscribers through the radio waves and the base station 11. In the example being illustrated, the radio waves are in common to the first through n-th telephone sets 121 to 12n and may therefore be smaller in number to the first through n-th telephone sets 121 to 12n. For convenience of description, the number of the radio waves is assumed to be greater than three. Under the circumstances, the radio waves include a first through k-th speech radio waves for speech between the telephone sets 12 (suffixes omitted) and the other subscribers. The first through k-th speech radio waves form first through k-th speech channels, respectively. The number k of the speech radio waves may be equal to the number m of the telephone lines 13 (suffixes omitted), although such equality of the number k to the number m is not always necessary in this invention. Each of the first through k-th speech radio waves is divisible into a first partial speech wave directed from the base station 11 towards the cordless telephone sets 12 and a second partial speech wave directed from each cordless telephone set 12 towards the base station 11. The first and the second partial speech waves will be called a down speech channel and an up speech wave which are used in pairs, respectively.

It is mentioned here that a control radio wave is included in the radio waves to control allocation of the speech radio waves to the respective telephone sets 12 in a manner to be described later and is located in a control frequency band different from the speech radio waves. The control radio wave forms a control channel and is also divisible into a down control channel and an up control channel which has a different frequency from the down control channel like the speech radio waves. The down and the up control channels are used in a manner to be described later.

The down speech channels and the down control channel are placed within a down frequency band which is different from an up frequency band allotted to the up speech channels and the up control wave.

At any rate, the first through k-th speech radio waves and the control radio wave may be arranged in a predetermined frequency band at an equal interval of frequency in the illustrated radio communication network, as will become clear as the description proceeds.

In FIG. 1, the base station 11 comprises a line interface portion 14 which is connected to the telephone lines 131 to 13m and which may be referred to as a subscriber circuit. The line interface portion 14 may comprise hybrid transformers for conversion between two-wire circuits and four-wire circuits and the other circuit elements, as will later be described. In any event, the line interface portion 14 is connected to a line control portion 15 through a plurality of signal line sets which will be described later in detail and which is collectively depicted at 161 to 16m, respectively. The number of the signal line sets is assumed to be equal to that of the telephone lines 131 to 13m in the illustrated example.

As shown in FIG. 1, the illustrated line control portion 15 is coupled to first through k-th radio units 181 to 18k to select one of the radio units 181 to 18k and thereby to allocate either one of the speech radio waves to each call as an allocated speech radio wave.

Each of the radio units 181 to 18k comprises a transmitter and a receiver and may be called a transmitter/receiver. The first through k-th radio units 181 to 18k can carry out transmission by selecting one of the down speech channels of the first through k-th speech radio waves. The radio units 181 to 18k can also carry out transmission by using the down control wave in a time division fashion. Likewise, they can carry out reception through the up speech channels of the first through k-th radio waves and the up control channel. This shows that each of the first through k-th radio units is of a multi-channel access type known in the art and that each of the first through k-th radio units is used in a time division fashion to transmit the down control channel and to receive the up control channel. Therefore, a specific transmitter/receiver is unnecessary so as to transmit and receive the down and the up control waves in the illustrated base station 11, respectively. It is presumed that each of the first through k-th radio units can not receive each down speech channel transmitted from each radio unit itself.

Anyway, the first through k-th radio units 181 to 18$k$ are connected to the line control portion 15 through unit lines collectively depicted at 21.

Furthermore, a control wave monitoring circuit 19 is coupled to the line control portion 22 through a switching control line 23 to monitor an undesired frequency component within the down control channel on transmission of the allocated speech radio wave. The control wave monitoring circuit 22 is operable to determine whether or not the down control channel is subjected to interference on transmission of the allocated speech radio wave. Let any interference take place in the down control channel on transmission of the allocated speech radio wave. This shows that the allocated speech radio wave accompanies the undesired frequency component which objectionably falls within the down control channel.

For this purpose, a field strength is measured by the control wave monitoring circuit 22 about the undesired frequency component or wave falling in the down control channel. Such a monitoring operation may be also carried out as regards the up control channel.

On the other hand, each of the first through n-th cordless telephone sets 121 to 12$n$ comprises a handset 25, a set controller 26, and a radio circuit 27, as represented by the first cordless telephone set. As well known in the art, the handset 25 comprises a microphone and a loudspeaker (not shown). The radio circuit 27 comprises a transmitter and a receiver like each of the radio units 181 to 18$k$ of the base station 11 while the set controller 26 controls transmission and reception of the radio circuit 27 in a manner to be described later. It is to be noted that the set controller 26 serves to send the base station a control signal which is received through the reception radio channel.

Figure 2:
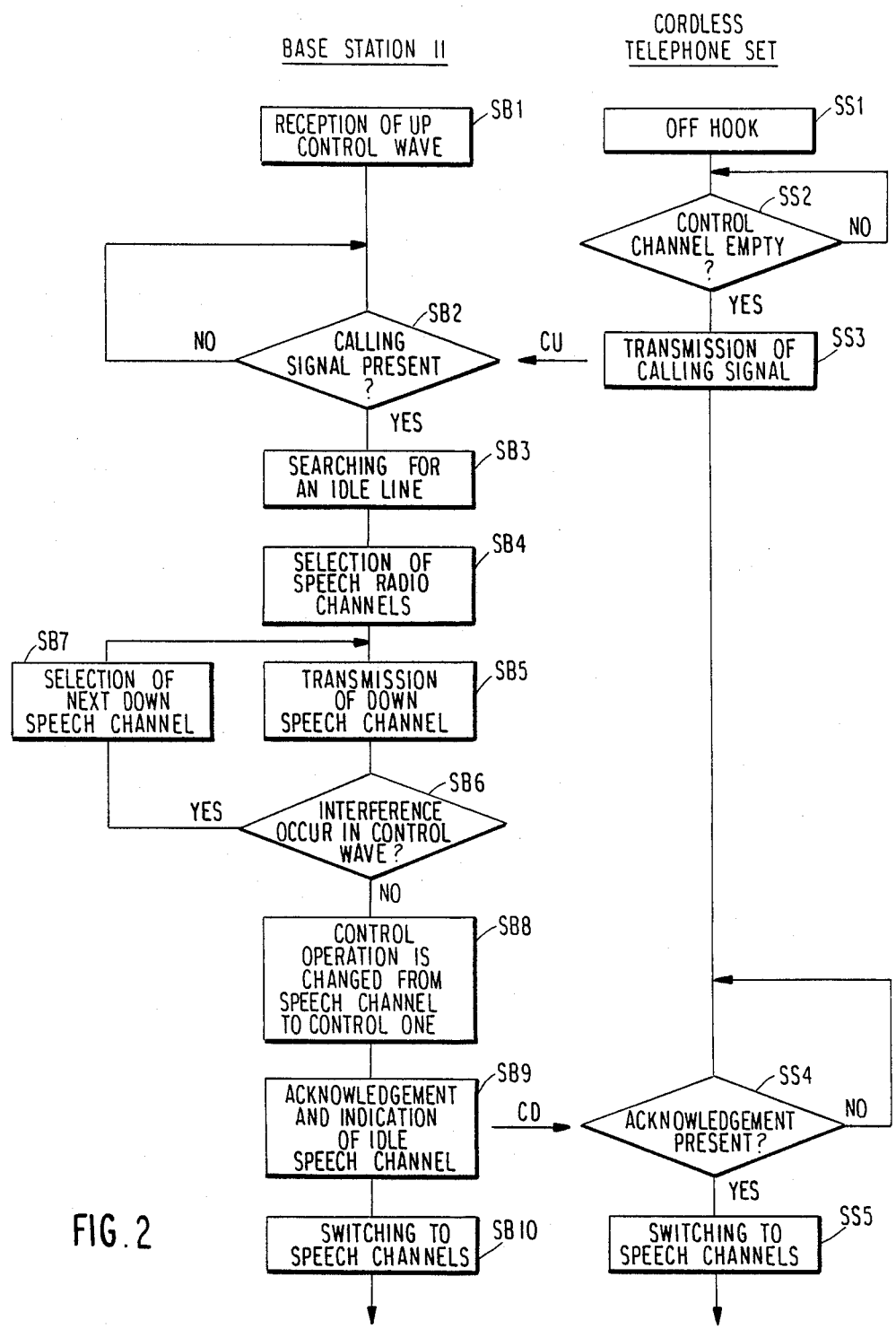
FIG. 2 is a flow chart for use in describing operation of the radio communication network that is carried out when a call originates from one of the cordless telephone sets.

Referring to FIG. 2 together with FIG. 1, operation will be described on the assumption that either one of the first through n-th cordless telephone sets 121 to 12$n$ goes off hook to communicate with one of the other parties or subscribers, as shown at a first set stage SS1 in FIG. 2. The set controller 26 of the cordless telephone set in question is put into an active state to detect at a second set step SS2 whether or not the down control channel sent from the base station 11 is idle or empty at present. If the down control channel is idle, the second set step SS2 is followed by a third set step SS3 at which a calling signal is sent or transmitted to the base station 11 through the up control channel depicted at CU in FIG. 2. Otherwise, the second set step SS2 is repeated until the down control channel becomes unused or vacant.

On the other hand, the base station 11 monitors the up control channel CU, as shown at a first base step SB1. Such a monitoring operation of the up control channel CU is carried out in each of the first through k-th radio units 181 to 18$k$ in a time division fashion. As a result, each of the first through k-th radio units 181 to 18$k$ is intermittently put into a reception state of the up control channel CU.

During the monitoring operation of the up control channel CU, each of the first through k-th radio units 181 to 18$k$ is selectively supplied with the calling signal carried by the up control channel. In this situation, the first base step SB1 is followed by a second base step SB2 at each of the radio units 181 to 18$k$. At the second base step SB2, each radio unit 181 to 18$k$ monitors the up control channel to detect whether or not the calling signal is carried by the up control channel. Such detection is repeated in each of the radio units 181 to 18$k$ until the calling signal is received. When the calling signal is detected by either one of the first through k-th radio units 181 to 18$k$, a third base step SB3 succeeds the second base step SB2 so as to search for an unused one of the telephone lines 131 to 13$m$.

On the other hand, an idle one of the down speech channels is selected under control of the line control portion 15 and is set to the one radio unit in question at a fourth base step SB4. The radio unit in question transmits a selected one of the speech waves through the idle down channel as shown at a fifth base step SB4 towards the cordless telephone sets 121 to 12$n$.

Under the circumstances, the control wave monitoring circuit 22 detects whether or not interference takes place in the down control channel on transmission of the selected speech wave, as shown at a sixth base step SB6.

When any interference occurs in the down control channel, the sixth base step SB6 is followed by a seventh base step SB7 at which the control wave monitoring circuit 22 supplies the line control portion 15 with a radio channel switching signal through the switching control line 23 to switch the idle down speech channel in question. The radio channel switching signal is representative of a request for switching the allocated speech radio wave to another one and may be called a switching request signal. Responsive to the radio channel switching signal, the line control portion 15 selects another one of the down speech channels as a next down speech channel to set the same to the radio unit in question. Thus, the idle or previous speech wave is switched to the next speech wave by the radio unit in question as shown at the seventh base step SB7.

If any interference is not detected by the control wave monitoring circuit 22, the sixth base step SB6 proceeds to an eighth base step SB8 at which control operation of the line control portion 15 is changed from the down speech channels to the down control channel. Thereafter, the radio unit in question transmits an acknowledgement signal and an indication signal by the use of the down control channel depicted at CD towards the cordless telephone sets under control of the line control portion 15, as shown at a ninth base step SB9. The acknowledgement signal is representative of acknowledgement of the calling signal while the indication signal is representative of a specific one of the up speech channels that corresponds to the above-mentioned next speech wave.

Subsequently, the radio unit in question is put into a state of receiving the specific up speech channel by switching the speech waves from one to another at a tenth base step SB10 and carries out seizing operation in a known manner.

Further referring to FIG. 2, the cordless telephone set under consideration is set into a reception state of the above-mentioned down control channel CD at a fourth set step SS4 carried out after the third set step SS3. In this case, the cordless telephone unit judges whether or not the acknowledgement signal is carried through the down control channel CD.

If the acknowledgement signal is carried through the down control channel CD, the fourth set step SS4 is followed by a fifth set step SS5 at which the up speech channel is selected in response to the indication signal. Thereafter, the cordless telephone set under consideration carries out seizing operation in a known manner and communication through the specific up speech channel.

Figure 3:
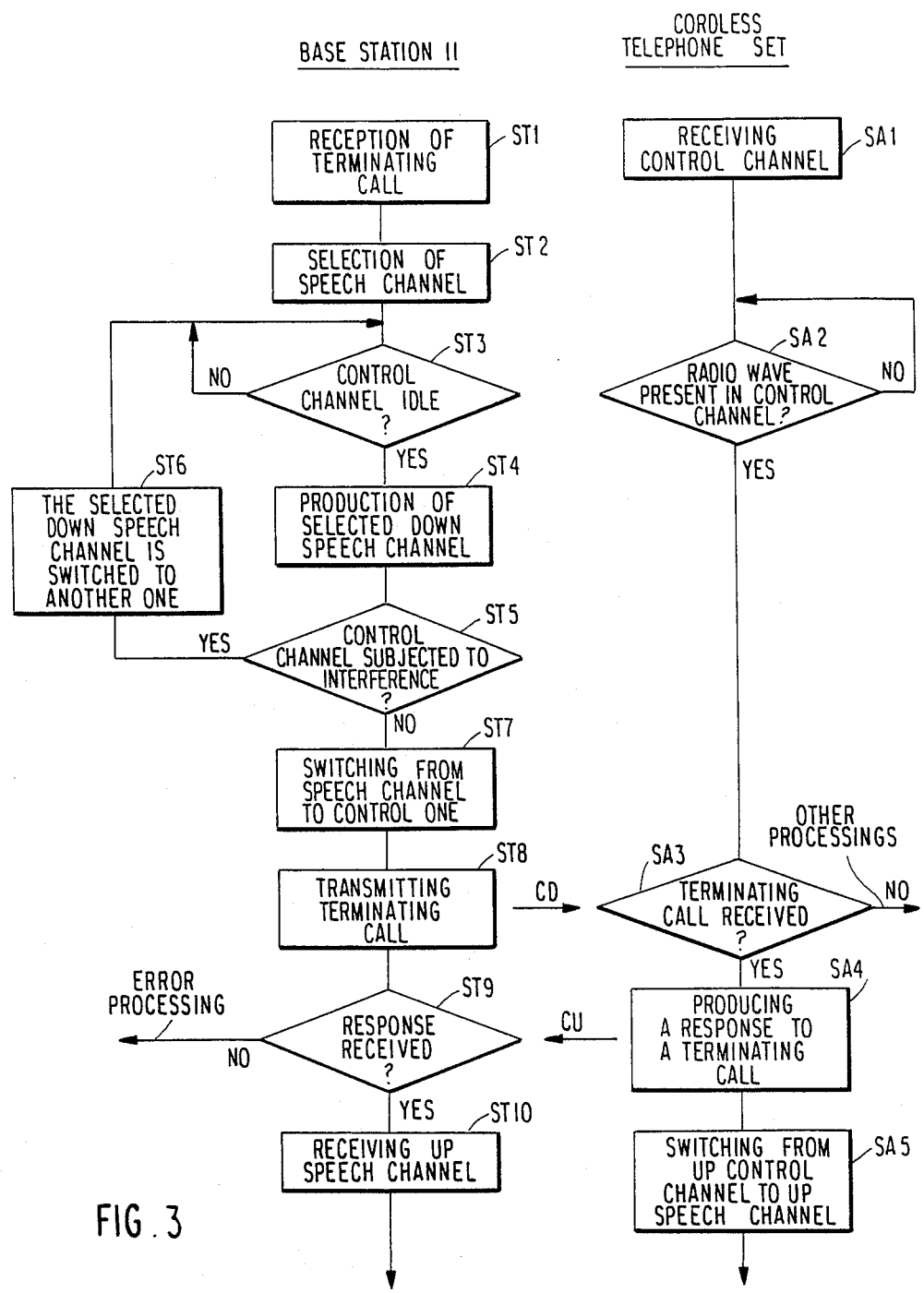
FIG. 3 is another flow chart for use in describing another operation of the radio communication network carried out when a call is a terminating call to a certain one of the cordless telephone sets.

Referring to FIG. 3 in addition to FIG. 1, another operation of the radio communication network illustrated in FIG. 1 will be described on the assumption that a terminating call is received through either one of the telephone lines 131 to 13m from a calling one of the subscribers by the base station 11 to talk or communicate with a selected one of the cordless telephone sets. When the terminating call is received by the base station 11 at a first station step ST1, the base station 11 selects one of the down speech channels at a second station step ST2 as a selected down speech channel which is made to correspond to a selected one of the up speech channel. Such selection may be carried out under control of the line control portion 15.

A third station step ST3 follows the second station step ST2 to detect whether or not the down control channel is idle or vacant. The third station step ST3 is continued until the down control channel becomes idle. If the down control channel becomes idle, the third station step ST3 is followed by a fourth station step ST4 at which the selected speech wave is transiently produced.

Production of the selected speech channel is monitored by the control signal monitoring circuit 22 at a fifth station step ST5. The control signal monitoring circuit 22 measures the field strength of the down control wave, as mentioned before, and can detect interference which might occur due to the production of the selected down speech wave, as shown at the fifth station step ST5.

If the down control channel is subjected to interference by production of the selected speech wave, the fifth station step ST5 is followed by a sixth station step ST6 at which the selected speech wave is switched to an indicated one of the speech waves. Otherwise, the fifth station step ST5 is succeeded by a seventh station step ST7 at which operation of the base station 11 is switched from the speech waves to the control one.

At an eighth station step ST8 following the seventh station step ST7, the terminating call and the indicated radio wave are transmitted through the down control channel CD towards the cordless telephone sets 121 to 12n. Thereafter, the base station 11 is put into a waiting state of receiving a response signal sent from a called one of the cordless telephone sets 121 to 12n.

In FIG. 3, the called cordless telephone set intermittently receives the down control channel at a first telephone step SA1. The first telephone step SA1 is followed by a second telephone step SA2 at which the called cordless telephone set judges whether or not a radio wave is present in the the down control channel.

When any radio signal is present in the down control channel, a third telephone step SA3 follows the second telephone step SA2 to detect whether or not a terminating call is received through the down control channel CD. If no terminating call is received, the third telephone step SA3 is succeeded by any other processings that include an operation of identifying a call number preassigned to each cordless telephone set, as known in the art.

On reception of the terminating call, the third telephone step SA3 is succeeded by a fourth telephone step SA4 of producing a response signal to the terminating call through the up control channel CU. Thereafter, the up control channel is switched to an indicated one of the up speech channels indicated by the base station 11, as shown at a fifth telephone step SA5 and proceeds to a seizing operation known in the art.

At a ninth station step ST9, the base station 11 detects whether or not the response signal is received. On reception of the response signal, the ninth station step ST9 is followed by a tenth station step ST10 to receive the up speech channel in question and to carry out the seizing operation. On reception of no response signal, the ninth station step ST9 proceeds to error processing.

Figure 4:
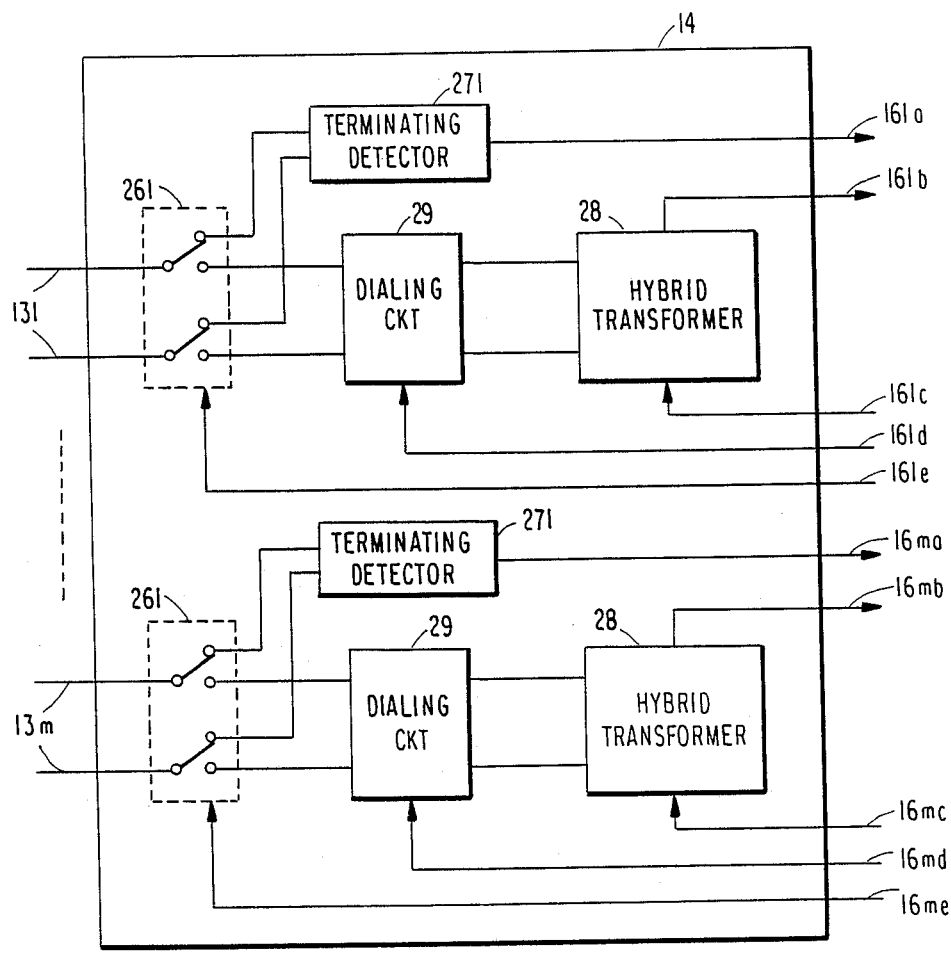
FIG. 4 is a block diagram of a portion of the base station illustrated in FIG. 1.

Referring to FIG. 4, a line interface portion 14 is applicable to that illustrated in FIG. 1 and is connected to the telephone lines 131 to 13m and the signal line sets 161 to 16m. In FIG. 4, each of the telephone lines 131 to 13m is depicted at two wires while each of the signal line sets 161 to 16m has first through fifth signal lines depicted at suffixes a, b, c, d, and e, respectively. The line interface portion 14 comprises line switches which correspond to the telephone lines 131 to 13m and which are collectively depicted at 261. Each of the line switches 261 is connected to a terminating detector 271 on one hand and is connected to a hybrid transformer 28 through a dialing circuit 29 on the other hand.

A terminating call is sent from each telephone line 131 to 13m through the line switch 261 to the terminating detector 271. The terminating detector 271 detects reception of the terminating call to inform the line control portion 15 of reception of the terminating call through each of the first signal line 161a to 16ma.

The line switch 261, the dialing circuit 29, and the hybrid transformer 28 are controlled by the line control portion 15 through the third through fifth signal lines, respectively. The dialing circuit 29 produces in a known manner a selection signal which may be either a dial pulse signal or a dual tone multi-frequency (DTMA) signal. The hybrid transformer 28 is also known in the art and is used for conversion between a two-wire circuit and a four-wire circuit. As a result, the hybrid transformer 28 sends a speech or data signal to the line control portion 15 through each of the second signal lines 161b to 16mb and receives a speech or data signal from the line control portion 15 through each of the third signal lines 161c to 16mc. From the above, it is readily understood that combinations of the line switch 261, the terminating detector 271, the dialing circuit 29, and the hybrid circuit 28 are equal in number to the telephone lines 131 to 13m which are accommodated in the line interface portion 14.

Figure 5:
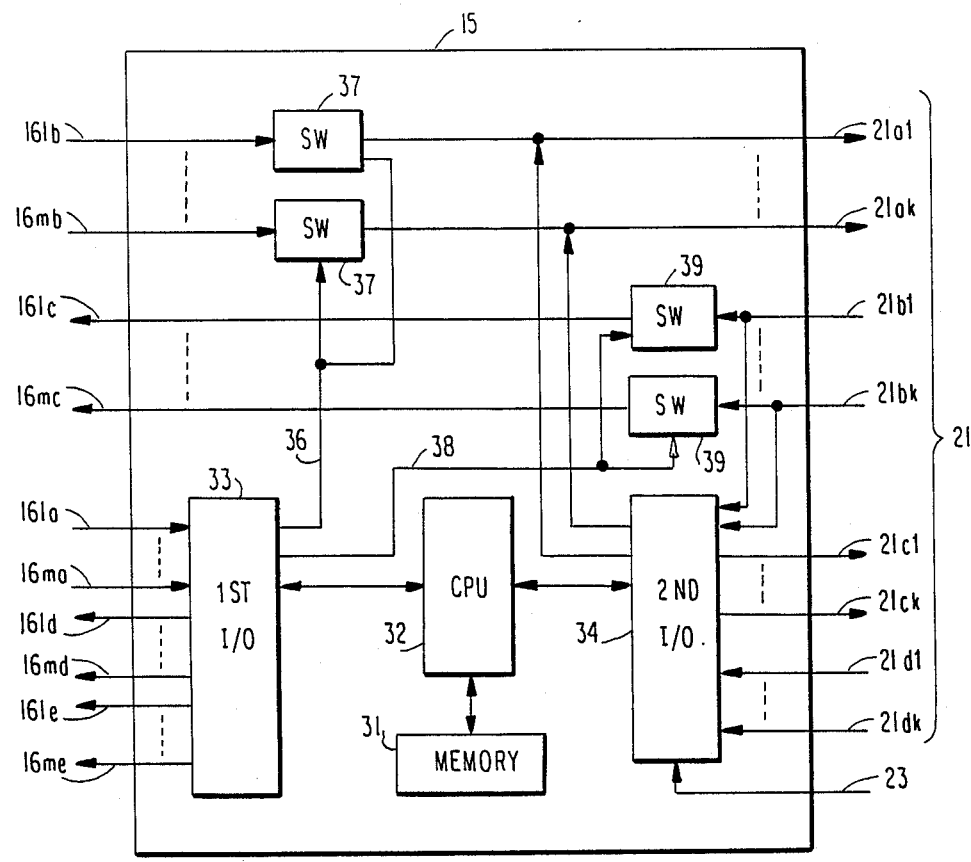
FIG. 5 is a block diagram of another portion of the base station illustrated in FIG. 1.

Referring to FIG. 5, a line control portion 15 is applicable to that illustrated in FIG. 1 and is connected to the line interface portion 13 through the signal line sets 161 to 16m each of which comprises the first through fifth signal lines specified by a through e, respectively. On the other hand, the illustrated line control portion 15 is connected to the first through k-th radio units 181 to 18k through the unit lines 21 and is also connected to the control wave monitoring circuit 22 through the switch control line 23.

The illustrated line control portion 15 comprises a memory 31 storing a control program and a central processing unit (CPU) 32 coupled to first and second input/output (I/O) interfaces 33 and 34. The central processing unit 32 controls and monitors the line interface portion 14, the first through k-th radio units 181 to 18k, and the control wave monitoring circuit 22 in accordance with the control program stored in the memory 31.

More particularly, the first input/output interface 33 is connected to the terminating detectors 271 through the first signal lines 161a to 16ma to detect reception of each terminating call from each telephone line 131 to 13m. The first input/output interface 33 is also connected to the dialing circuits 29 through the fourth signal lines 161d to 16md to send the selection signals to the dialing circuits 29, respectively, and to the line switches 261 through the fifth signal lines 161e to 16me to turn the line switches 261 on or off, respectively.

The first input/output interface 33 is further connected through a first internal control line 36 to first switches 37 connected to the second signal lines 161b to 16mb. The first switches 37 are connected to the respective radio units 181 to 18k through first ones 21al to 21ak of the unit lines 21. In addition, the first input/output interface 33 is connected through a second internal control line 38 to second switches 39 which are placed between second ones 21bl to 21bk and the third signal lines 161c to 16mc.

At any rate, each of the first and the second switches 37 and 39 is operable to switch a speech or data signal on or off.

The second input/output interface 34 is connected to the first unit lines 21al to 21ak and the second unit lines 21bl to 21bk, so as to carry out transmission and reception of speech or data signals and control signals in relation to the cordless telephone sets 121 to 12n in a known manner. The second input/output interface 34 is also connected to the radio units 181 to 18k through third ones 21cl to 21ck of the unit lines 21 through which frequency control signals are delivered to the third unit lines 21cl to 21ck in a manner to be described later. Fourth ones 21dl to 21dk of the unit lines 21 are connected to the radio units 181 to 18k to monitor squelch signals given from the radio units 181 to 18k.

In the example being illustrated, the switching control line 23 is also connected to the second input/output interface 34 to receive the radio channel switching signal, namely, the switching request signal. The second input/output interface 34 is operable in cooperation with the central processing unit 32 to change the allocated speech radio wave to another speech radio wave in response to the radio channel switching signal when any interference occurs in the down control channel.

Figure 6:
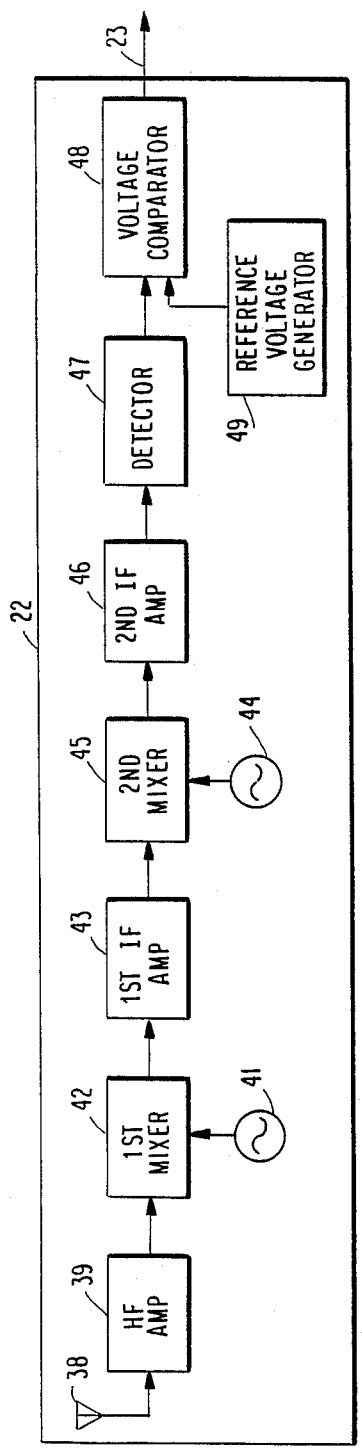
FIG. 6 is a block diagram of a further portion of the base station illustrated in FIG. 1.

Referring to FIG. 6, description will be made about a control wave monitoring circuit 22 which is applicable to the base station 11 illustrated in FIG. 1 and which is formed by a double-superheterodyne receiver. As shown in FIG. 6, the control wave monitoring circuit 22 comprises an antenna 38, a high-frequency amplifier 39, a first local oscillator 41, a first mixer 42, a first intermediate-frequency amplifier 43, a second local oscillator 44, a second mixer 45, and a second intermediate-frequency amplifier 46, which are all known in the art and which will not be described any longer. It may be understood that a local frequency of the first local oscillator 41 is adjusted so that the control wave monitoring circuit 22 is tuned to the down control channel.

An output signal of the second intermediate-frequency amplifier 46 is sent through an envelope detector 47 to a voltage comparator 48 which is supplied with a reference voltage from a reference generator 49. Thus, it is possible to detect or measure an amplitude component of the field strength of the down control channel by carrying out envelope detection in the envelope detector 47 by the use of a diode. Therefore, the detector may be called a measuring circuit for measuring the field strength to produce a measurement signal indicative of a measured field strength. In any event, the radio channel switching signal is produced from the voltage comparator 48 through the switching control line 23 when the amplitude component of the field strength in the down control channel exceeds the reference voltage. The radio channel switching signal is received through the second input/output interface 34 (FIG. 5) to the central processing unit 32 only on transmission of the down speech channel in the illustrated example.

Figure 7:
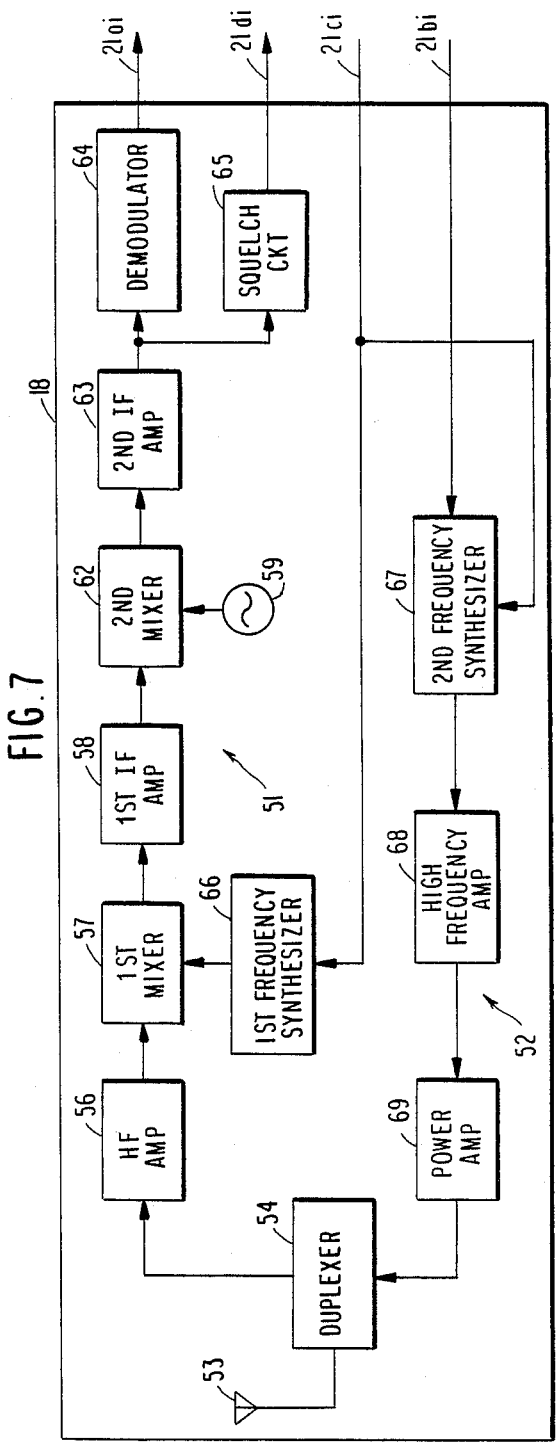
FIG. 7 is a block diagram of a part of each radio unit of the base station illustrated in FIG. 1.

Referring to FIG. 7, a radio unit 18 (suffix omitted) is exemplified which comprises a receiver section 51 and a transmitter section 52 both of which are coupled to an antenna 53 through a duplexer 54. The receiver section 51 is connected to the first, the fourth, and the third unit lines 21ai, 21di, and 21ci, where i is an integer between unity and k, both inclusive, while the transmitter section 52 is connected to the second unit line 21bi.

The receiver section 51 comprises a high-frequency amplifier 56, a first mixer 57, a first intermediate-frequency amplifier 58, a local oscillator 59, a second mixer 62, a second intermediate-frequency amplifier 63, a demodulator 64, and a squelch circuit 65, which are known in the art. The demodulator 64 is connected to the line control portion 15 through the first unit line 21ai to send a speech or data signal to either one of the telephone lines 13 while the squelch circuit 65 is connected to the fourth unit line 21di to carry out squelch operation in a known manner.

It is to be noted here that the first mixer 57 is connected through the third unit line 21ci to a first frequency synthesizer 66 instead of the first local oscillator 41 as shown in FIG. 6. The first frequency synthesizer 66 is supplied with the frequency control signal from the line control portion 15. As a result, the illustrated receiver section 51 can be adjusted to each of the up speech channels and the up control channel in response to the frequency control signal.

The transmitter section 52 also comprises a second frequency synthesizer 67 which is controlled in common to the first frequency synthesizer 66 and which is supplied with a speech or data signal through the second unit line 21bi from either one of the telephone lines 13. Thus, the speech or data signal is arranged in one of the down speech channels selected in response to the frequency control signals and is subjected to amplification by a high-frequency amplifier 68 and a power amplifier 69 to be sent through the duplexer 54 and the antenna 53.

Figure 8:
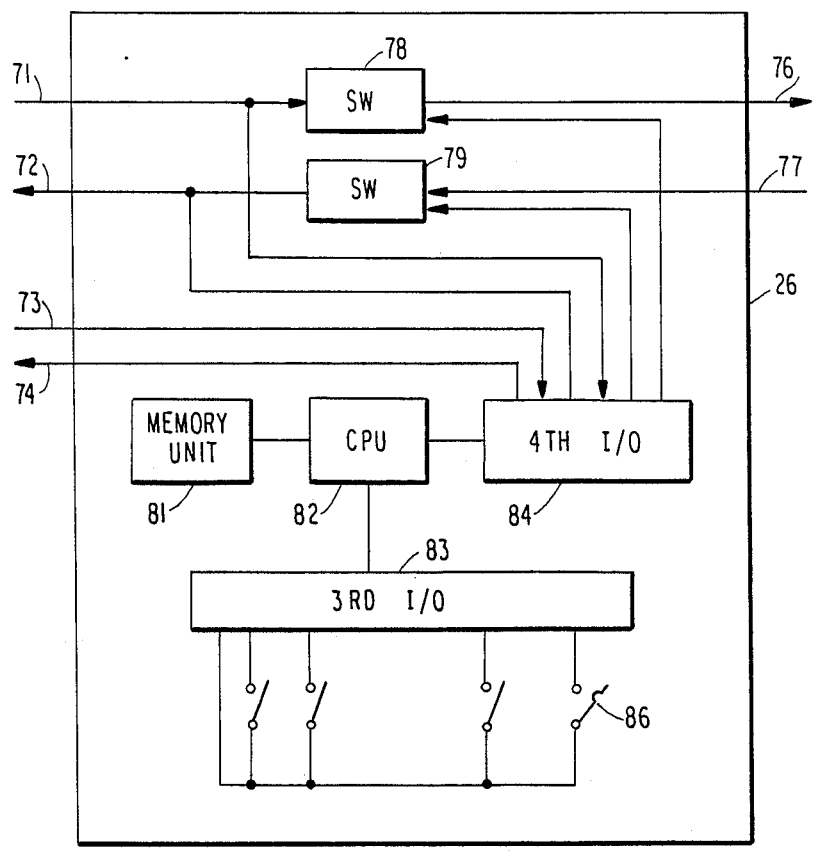
FIG. 8 is a block diagram of another part of each cordless telephone set illustrated in FIG. 1.

Referring to FIG. 8, a set controller 26 is applicable to the cordless telephone sets 121 to 12n illustrated in FIG. 1 and is intermediate between the radio circuit 27 and the handset 25. The illustrated set controller 26 is connected to the radio circuit 27 through a reception line 71 given a speech or data signal, a transmission line 72 for a speech or data signal given to the radio circuit 27, a squelch signal line 73 for a squelch signal supplied from the radio circuit 27, and a synthesizer control line 74 for a frequency control signal delivered to a frequency synthesizer (not shown) included in the radio circuit 27. As a result, the radio circuit 27 selects the up speech channels or the down speech channels in a manner illustrated in FIG. 7.

In addition, the set controller 26 is connected to the handset 25 through a handset reception line 76 and a handset transmission line 77.

First and second switches 78 and 79 are interposed between the reception and transmission lines 71 and 72 and the handset reception and the handset transmission lines 76 and 77.

The illustrated set controller 26 comprises a memory unit 81 storing a telephone control program and a central processing unit 82 for controlling and monitoring third and fourth input/output interfaces 83 and 84 in accordance with the telephone control program. The third input/output interface 83 monitors various kinds of switches, especially, a hook switch depicted at 86 to control a terminating call and an originating call. The fourth input/output interface 84 is connected to the reception line 71 and the transmission line 72 to carry out reception and transmission of control signals which are received from and transmitted to the base station, respectively. In addition, the control processing unit 82 detects status of connection between the cordless telephone set 12 and the base station 11 by monitoring the squelch signal line 73.

While this invention has thus far been described in conjunction with a preferred embodiment thereof, it will readily be possible for those skilled in the art to put this invention into practice in various other manners. For example, the control wave monitoring circuit 22 may monitor the up control channel in lieu of the down control channel. Mobile radio telephone sets may be substituted for the cordless telephone sets. A plurality of control radio waves may be prepared to control a lot of speech waves. In addition, a control radio unit may be included in the base station so as to receive and transmit the control radio wave or waves. The control wave monitoring circuit 22 may be controlled by a microprocessor to determine an optimum idle speech channel in consideration of a combination of busy speech channels.

What is claimed is:

1. In a base station for use in a radio communication network between a plurality of telephone lines connected to substations and a plurality of wireless telephone sets for communication by the use of a plurality of radio waves having different frequencies, said base station comprising line interface means for connection to said plurality of the telephone lines, a plurality of radio communication units for communication with the respective wireless telephone sets through said radio waves, and connection control means intermediate between said line interface means and said radio communication units for selectively connecting said line interface means to said radio communication units, said radio waves including a plurality of speech radio waves for speech between said wireless telephone sets and said substations and a control radio wave predetermined for allocation control of said speech radio waves, each of said radio communication units being communicable with each of said wireless telephone sets by selecting one of said speech radio waves that is unused and by transmitting said one of the speech radio waves towards said wireless telephone sets, the improvement wherein:
said base station comprises monitoring means operation on transmission of said one of the speech radio waves for monitoring said control radio wave after selection of said one of the unused speech radio waves to determine whether or not interference takes place in said control radio wave due to transmission of said one of the speech radio waves, said monitoring means supplying said connection control means with a switching request signal indicative of a request for switching said one of the speech radio waves when said interference is monitored;
said connection control means comprising means responsive to said switching request signal for changing said one of the speech radio waves to another unused one of said speech radio waves.

2. A base station as claimed in claim 1, said control radio wave comprising a down control channel directed from said base station towards said wireless telephone sets, wherein said monitoring means monitors said down control channel.

3. A base station as claimed in claim 1, said control radio wave comprising an up control channel directed from each of said wireless telephone sets towards said base station, wherein said monitoring means monitors said up control channel.

4. A base station as claimed in claim 1, wherein said monitoring means comprises:
measuring means for measuring a field strength of said control radio wave to produce a measurement signal indicative of a measured field strength;
reference generating means for generating a reference signal indicative of a reference field strength; and
comparing means for comparing said measurement signal with said reference signal to produce said switching request signal when said measured field strength exceeds said reference field strength.

5. A radio communication network comprising a base station to be connected to a plurality of telephone lines and a plurality of wireless telephone sets for communication by the use of a plurality of radio waves having different frequencies, said base station comprising line interface means for connection to said plurality of the telephone lines, a plurality of radio communication units for communication with the respective wireless telephone sets through said radio waves, and connection control means intermediate between said line interface means and said radio communication units for selectively connecting said line interface means to said radio communication units, said radio waves including a plurality of speech radio waves for speech between said wireless telephone sets and said substations and a control radio wave predetermined for allocation control of said speech radio waves, each of said radio communication units being communicable with each of said wireless telephone sets by selecting one of said speech radio waves that is unused and by transmitting said one of the speech radio waves toward said wireless telephone sets the improvement wherein:
said base station comprises monitoring means operable on transmission of said one of the speech radio waves for monitoring said control radio wave after selection of said unused one of the speech radio waves to determine whether or not interference takes place in said control radio wave due to transmission of said unused one of the speech radio waves, said monitoring means supplying said connection control means with a switching request signal indicative of a request for switching said one of the speech radio waves when said interference is monitored;

said connection control means comprising means responsive to said switching request signal for changing said one of the speech radio waves to another unused one of said speech radio waves.

6. A radio communication network as claimed in claim 5, wherein each of said wireless telephone sets is a cordless telephone set.

7. A radio communication network as claimed in claim 5, wherein each of said wireless telephone sets is a mobile telephone set.

8. A base station as claimed in claim 1, said connection control means comprising:
  means for linking a selected one of said radio communication units to one of said telephone lines and;
  means responsive to said switching request signal for producing an indication signal indicating either said one of the speech radio waves or said another unused one of said speech radio waves;
each of the radio communication units comprising:
  means responsive to the indication signal from said connection control means for selecting either said one of the speech radio waves or said another unused one of said speech radio waves.

* * * * *